G. WESTINGHOUSE, JR
STEAM POWER BRAKE
NO. 88,929.  PATENTED APR. 13, 1869
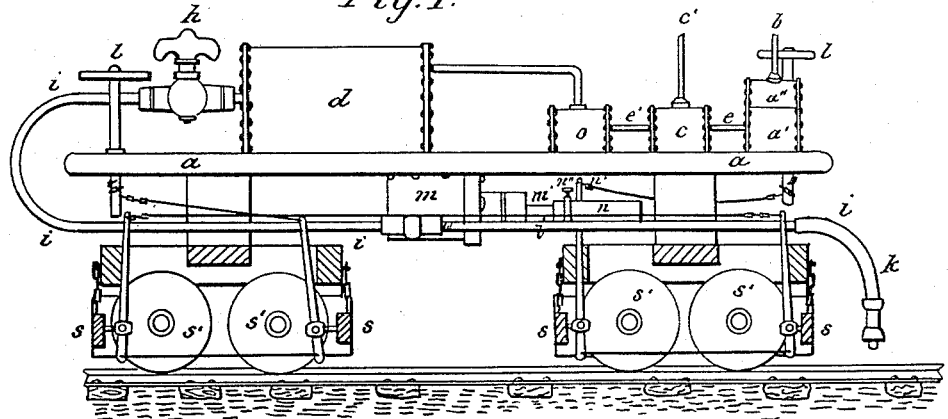
Fig. 1.
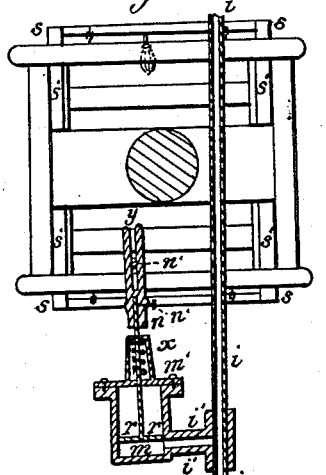
Fig. 2.
Fig. 3.  Fig. 4.
 
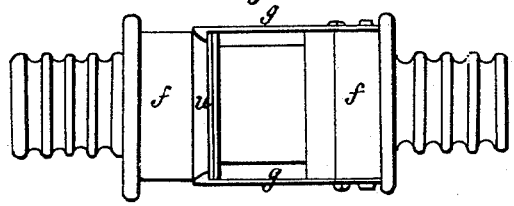
Fig. 5.
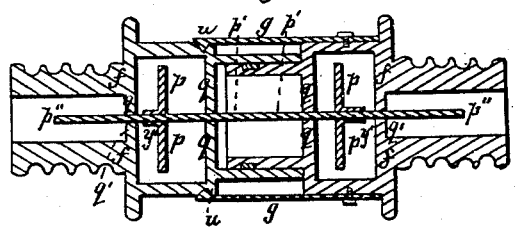
Fig. 6.
Witnesses
Thos. B. Kew
R. C. Crenshaw
Inventor
George Westinghouse, Jr
by Bakewell & Christy
his Att'ys.

UNITED STATES PATENT OFFICE.

GEORGE WESTINGHOUSE, JR., OF SCHENECTADY, NEW YORK.

IMPROVEMENT IN STEAM-POWER-BRAKE DEVICES.

Specification forming part of Letters Patent No. 88,929, dated April 13, 1869.

*To all whom it may concern:*

Be it known that I, GEORGE WESTINGHOUSE, Jr., of Schenectady, in the county of Schenectady and State of New York, have invented a new and useful Improvement in Power Car-Brakes; and I do hereby declare the following to be a full, clear, and exact description thereof, reference being had to the accompanying drawing, making a part of this specification, in which—

Figure 1 shows by a side elevation, partly in section, my improvement as mounted on and applied to an ordinary platform railroad-car. Fig. 2 is a sectional plan view as formed by a horizontal plane passing through the brake-cylinder, just below the body of the car. Fig. 3 is a vertical, and Fig. 4 is a cross section of the three-way cock by which I admit or cut off the supply of air to the brake. Fig. 5 is an outside view, and Fig. 6 is a longitudinal section of my improved coupling for uniting the brake-pipes of contiguous cars.

Like letters represent like parts of each.

My invention relates to the construction of a power car-brake for railway-cars or other like vehicles, to be operated by compressed air or other elastic compressible fluid; and the nature of it consists, first, in the use of an auxiliary engine for compressing the air in a reservoir, from which it is to be conducted by suitable pipes and applied to operating the brakes, and also for pumping feed-water into the boiler, either or both; second, in the construction of a reservoir for storing up the power to be derived from air or other elastic fluid under compression, such reservoir having a pipe or pipes leading to one or more brake-cylinders on or attached to each car, with a valve or cock in each pipe for turning on or off the supply of air; third, in the construction and combination of devices by which the power thus communicated to the piston of the brake-cylinder may be from it applied to operating an ordinary hand-brake, or any other known form of simple or compound brake; fourth, in the construction of an improved coupling for uniting the brake-pipe of contiguous cars, so made that when coupled they shall be always open for the passage of air to the brake-cylinders, but if uncoupled, when the brakes are down, the pressure of the air in the pipes will instantly close them.

To enable those skilled in the art to make and use my invention, I will proceed to describe its construction and manner of use.

*a* represents a platform-car, on which is mounted an auxiliary engine, *a' a''*, a feed-water-pumping cylinder, *c*, and an air-pump, *o*, and an air-reservoir, *d*. A single piston-rod connection, *e e'*, may answer for both pumps; or one piston-rod may lead from the auxiliary engine *a' a''* to the feed-water pump *c*, and another to the air-pump *o*. In either case the operation would be the same. *b* is a steam-pipe leading from the locomotive-boiler to the auxiliary engine *a' a''*. A water-pipe extends from the water-tank on the tender to the pumping-cylinder *c*, and, by a piston working therein, water is fed through the pipe *c'* to the boiler. The air-pump *o* has the usual valves, and works on the principle of the ordinary air-pump, and compresses the air into the reservoir *d*. Each of these cylinders is fitted with the valves and cocks necessary to their successful operation.

From the reservoir *d* an air-pipe, *i*, leads down and back along under the cars of the train, the communication through the pipe being opened and closed by a three-way cock, *h*, presently to be described.

At any convenient point on or under each car a brake-cylinder, *m*, is attached, having a piston working closely therein. A pipe, *i'*, leads from the main pipe *i* to each brake-cylinder *m*, opening into it back of the piston *r*. The piston-stem *m'* plays through the opposite end of the brake-cylinder *m*, and at its outer end may be bifurcated, so as to operate against the brake-lever *n'*; or an adjustable bifurcated head, *n*, may be set thereon by a set-screw, *n''*. The brake-lever *n'* and the brakes connected therewith may be simple or compound, or of any known or desirable construction. As shown, they are of the ordinary style. It will be observed that, with the construction and arrangement shown, the operation of the "doctor" or feed-water pump, and of the brakes, is in no way dependent on the movements of the locomotive. If steam be up, water can be fed into the boiler, even when the locomotive is standing, which end is a desirable one, since it sometimes is far from convenient to run a locomotive and train forward or back merely to replenish the supply of water in the boiler, and still more so at other times to slack up a train for the same purpose. In like manner, the operation of the auxiliary engine $a'\ a''$ may be so regulated, even with the locomotive running at its highest speed, and with an occasional or even frequent application of the brakes, that a uniformly constant pressure of air can be preserved in the reservoir $d$. This auxiliary engine $a'\ a''$, with the pumps $c\ o$ and reservoir $d$, may, and probably should be for convenience, mounted on or attached in some way to the locomotive or tender. As they are small, light, and not costly, they can be easily and cheaply applied. If it be desired to operate either alone, the connecting-valves of the other may be closed, and its piston work *in vacuo*, without in the least interfering with the working of the other.

The reservoir $d$ being filled with compressed air, whenever it is desirable to apply the brakes the cock $h$ is turned, and the air rushes along, through the pipes $i\ i'$, into the brake-cylinder $m$, forces its rod $m'$ against the brake-lever $n'$, whereby the brakes $s$ are instantaneously applied to the wheels $s'$, and the speed of the train at once checked. Of course, the more the air is compressed in the reservoir $d$, the more powerful will be its action on the brakes.

The cock $h$ is a three-way cock—that is, it opens on three sides. When turned as in Fig. 4, the air flows freely through from the reservoir $d$, as described. On being turned one-quarter way around, the orifice $z$ comes into the tubular opening of the pipe $i$, leading to the brakes, and the orifice $z'$ coincides with the orifice in the side of the valve-seat, so that communication is cut off from the reservoir $d$ to the brakes, but opened from the brake-cylinders to the external atmosphere. The excess of air then escapes. The spiral spring $x$, Fig. 2, carries the piston $r$ of the brake-cylinder $m'$ back to the head of the brake-cylinder, and the brakes are off. The length of throw to be given to the brake-lever $n'$ may sometimes vary somewhat, and hence I use the adjustable head $n$. The bifurcation $y$, whether made in the head $n$ or in the stem $m'$, is of such depth that if it be sometimes preferred to operate the brakes by hand, the levers $n'$ will not be drawn out of the fork or slot of the bifurcated end; and to illustrate such use I have shown the ordinary hand-brakes $l$ attached.

To provide for longitudinal motion of the cars independent of each other in starting or stopping, I use between each two cars a section of air-tight flexible pipe, $k$, made of india-rubber, or india-rubber and cloth, or other like flexible and air-tight material.

An important feature of my invention consists of the construction and combination of coupling-valves, which I use in the ends $ff$ of the pipe $k$, where they are jointed between cars. These valves are more perfectly illustrated in Fig. 6, where $ff$ represent the adjacent or coupling ends of the pipes $k$ of two consecutive cars. The ends $f$ couple one into the other, and hooks $g$ pass over the beveled shoulders $u$ in the face of the coupling $f$, and prevent their coming uncoupled, except in case the car-coupling should break, or a car jump from the track, and then the hooks $g$ would be disengaged, and the coupling be uncoupled from each other. Inside each coupling $f$ is a puppet-valve, $p$, having a stem, $p'$, playing through a guide or diaphragm, $q$, the two stems being of such length that when the couplings $f$ are coupled together the stems will come together end to end, and each force back the other, so as to throw its valve $p$ free from its seat, and make an uninterrupted communication through the pipe $i$ from the reservoir $d$ to the last valve of the last car. The rear stems $p''$ play through guides or diaphragms $q'$, and keep the valves $p$ more carefully centered, so that the forward stems $p'$ will always engage each other when the cars are coupled. The guides $q\ q'$ should be open, or have openings, to admit of the passage from one pipe to the next of the compressed air. Then, when the pipes are uncoupled by the breaking of the car-coupling, or by a car leaving the track, the compressed air having been applied to the brakes, its pressure will cause the valves $p$ to come against their seats on the guides $q$, thereby closing the ends of the pipe and keeping the brakes on or down. Thus the danger from accident will be materially decreased. The stems $p''$ are made with shoulders $y'$, which rest against the guides $q'\ p'$ when the ends $f$ are coupled and the valves $p$ are opened. Consequently the valves $p$ cannot set back against the guides $q'$ to close them, nor can the compressed air, when admitted, close the valves $p$ or either of them. When the pipes are coupled, the valves $p$ must always be open. If they come uncoupled when filled with compressed air, they will be instantly closed, and must necessarily remain so. Hence, in the worst of disasters, the brakes will remain down if once applied.

Instead of the puppet-valves $p$, other forms of valves may be used, provided they be so arranged as to operate or open each other when the pipes $f$ are coupled together. For this purpose flap-valves with stems may be used; also, instead of the diaphragms for guiding the stems, wings on the stems may be substituted. In that case the wings may be so made as to slide in the cylindrical or other shaped cavity of the couplings $f$.

The hooks $g$ operate with sufficient rigidity to catch tightly in the grooves $u$, and hold the couplings $f$ together against any ordinary force exerted longitudinally to which they would be subject; but by beveling slightly the holding shoulder of the grooves $u$, as shown, the hooks $g$ would be disengaged, as in case of an accident, by any force sufficient to throw the car from the track or by the breaking of the car-coupling. In lieu of this device, however, other devices performing the same function may be substituted—that is, other means may be used to accomplish the same end, provided they be such as will hold the couplings $f$ together against the operation of any force to which in use they are ordinarily subject, but not such as to prevent their being automatically uncoupled in case of accident. At the same time all such devices should be so made that the couplings may be readily uncoupled by hand.

The particular advantages connected with the apparatus described, in addition to those above referred to, are, that the brakes are under the control of the engineer, and can be instantaneously applied at any time, and with any degree of power within the strength of the machinery employed, and the brakes can be as instantaneously loosened. They are simple in construction, cheaply made, and can be applied to and used in connection with or used without the ordinary hand-brakes. By the use of the auxiliary engine the operation of the brakes is made independent of the operation of the locomotive, so that much or little power can be stored up in the reservoir $d$ at any time, whether the locomotive be running fast or slow, or not at all; and, if desired, all the force of the air-pump can be applied to the brakes over and above the force that can be stored up in the reservoir. By this mode of operating brakes in connection with the couplings described, in case of accident the brakes may be instantaneously applied, and kept "on" till the whole train, or each separate car, if the car-couplings break, be brought to a complete stand.

What I claim as my invention, and desire to secure by Letters Patent, is—

1. The auxiliary engine, with connections to, and in combination with, the air-pump, air-reservoir, and brake-cylinder, substantially as hereinbefore set forth.

2. The auxiliary engine arranged to operate in connection with a railroad-locomotive, feed and water pumps, substantially in the manner hereinbefore set forth.

3. The reservoir $d$, with pipes $i$, leading to one or more brake-cylinders on, or attached to, each car, with a valve or cock in each pipe for turning on or off the supply of air, arranged substantially as above set forth.

4. The brake-cylinder $m$, in combination with the pipe $i'$, and piston-stem connecting with the brake-lever, substantially as hereinbefore set forth.

5. The adjustable head $n$ on the piston-stem $m'$, in connection with the brake-lever $w'$, substantially as hereinbefore set forth.

6. The valves $p$, arranged in the adjacent ends of the couplings $f$, and so guided by stems and guides or diaphragms as to operate to open each other when the couplings $f$ are united, and automatically to close when forcibly uncoupled, substantially as above set forth.

In testimony whereof I, the said GEORGE WESTINGHOUSE, Jr., have hereunto set my hand.

GEO. WESTINGHOUSE, JR.

Witnesses:
A. S. NICHOLSON,
G. H. CHRISTY.